United States Patent
Wu

(10) Patent No.: US 8,805,318 B2
(45) Date of Patent: Aug. 12, 2014

(54) METHOD OF HANDLING DATA TRANSMISSION ASSOCIATED WITH NATURAL DISASTER NOTIFICATION IN A WIRELESS COMMUNICATION SYSTEM AND RELATED APPARATUS

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 367 days.

(21) Appl. No.: 12/764,914

(22) Filed: Apr. 21, 2010

(65) Prior Publication Data

US 2010/0273444 A1   Oct. 28, 2010

Related U.S. Application Data

(60) Provisional application No. 61/172,226, filed on Apr. 24, 2009.

(51) Int. Cl.
*H04M 11/04* (2006.01)
*H04W 76/00* (2009.01)
*H04W 4/22* (2009.01)
*H04W 48/12* (2009.01)

(52) U.S. Cl.
CPC .............. *H04W 4/22* (2013.01); *H04W 76/007* (2013.01); *H04W 48/12* (2013.01)
USPC .................. 455/404.1; 455/404.2; 455/456.2; 455/414.1

(58) Field of Classification Search
USPC ....... 455/404.1, 404.2, 456.2, 414.1
See application file for complete search history.

(56) References Cited

U.S. PATENT DOCUMENTS

| | | | |
|---|---|---|---|
| 2004/0072583 A1 | 4/2004 | Weng | |
| 2004/0081249 A1* | 4/2004 | Tiedemann et al. | 375/260 |
| 2004/0203562 A1 | 10/2004 | Kolsrud | |
| 2010/0159871 A1* | 6/2010 | Tester | 455/404.2 |
| 2011/0250862 A1* | 10/2011 | Schliwa-Bertling et al. | 455/404.1 |

FOREIGN PATENT DOCUMENTS

| | | |
|---|---|---|
| EP | 1 791 099 A1 | 5/2007 |
| WO | 2008097894 A1 | 8/2008 |
| WO | 2009001288 A2 | 12/2008 |

OTHER PUBLICATIONS

Parkvall et al., (IEEE 2008) LTE-Advanced—Evolving LTE towards IMT-Advanced.*
NTT Docomo, Inc: "Proposals for ETWS air interface for Rel-8 EUTRAN", 3GPP TSG RAN WG2 #62, R2-082429, May 5-May 9, 2008, XP050140117, Kansas City, MO-USA.
3GPP TS 36.331 V8.5.0 Evolved Universal Terrestrial Radio Access (E-UTRA) Radio Resource Control (RRC), Mar. 2009.
3GPP TR 36.814 V0.4.1 Technical Specification Group Radio Access Network; Further Advancements for E-UTRA Physical Layer Aspects (Release 9), Feb. 2009.
Office action mailed on Feb. 23, 2013 for the Taiwan application No. 099112913, filing date Apr. 23, 2010, pp. 1-6.

* cited by examiner

*Primary Examiner* — Manpreet Matharu
(74) *Attorney, Agent, or Firm* — Winston Hsu; Scott Margo

(57) ABSTRACT

A method of handling data transmission associated with natural disaster notification for a mobile device of a wireless communication system includes activating a plurality of physical mediums for data reception in a radio resource control connected mode, and receiving a natural disaster notification message via at least some of the plurality of physical mediums.

11 Claims, 7 Drawing Sheets

METHOD OF HANDLING DATA TRANSMISSION ASSOCIATED WITH NATURAL DISASTER NOTIFICATION IN A WIRELESS COMMUNICATION SYSTEM AND RELATED APPARATUS

CROSS REFERENCE TO RELATED APPLICATIONS

This application claims the benefit of U.S. Provisional Application No. 61/172,226, filed on Apr. 24, 2009 and entitled "SCHEME TO HANDLE ETWS RECEPTION IN MULTIPLE CONNECTIONS IN WIRELESS COMMUNICATIONS SYSTEM" the contents of which are incorporated herein in their entirety.

BACKGROUND OF THE INVENTION

1. Field of the Invention

A method utilized in a wireless communication and apparatus thereof is disclosed, and more particularly to a method of handling data transmission associated with natural disaster notification in a wireless communication system and related apparatus.

2. Description of the Prior Art

Earthquake and Tsunami Warning System (ETWS), set forth by the 3rd Generation Partnership Project (3GPP), introduces a means to deliver Warning Notification simultaneously to many mobile users who should evacuate from approaching Earthquake or Tsunami. The ETWS consists of a PLMN (Public Land Mobile Network) that is capable to deliver Warning Notification and user equipments (UEs) that are capable to receive a warning notification. The PLMN of the ETWS can be a GERAN (GSM/EDEG radio access network) of a 2G/2.5G GSM system, a UTRAN (UMTS radio access network) of a 3G UMTS system, or a EUTRAN (evolved-UTAN) of a long term evolution (LTE) system, and each UE in all of the systems can only use a single component carrier at one time to establish a connection with one cell.

Warning notification providers, which are usually run by local governments, produce the warning notification to PLMN operator when an earthquake or tsunami event occurs. The warning notification is classified into two types depending on the purpose and urgency of the notification. The first type of warning notification is called primary notification that delivers the most important information of the threat that is approaching to users (e.g. the imminent occurrence of Earthquake or Tsunami) and shall be delivered to the users as soon as possible. For example, the primary notification can notify the UE of the disaster type. The second type of warning notification is called secondary notification that delivers additional information, such as instructions on what to do or where to get help.

The warning notification providers publish a primary notification to PLMN and specify the notification area where the warning notification is expected to be distributed when occurrence of a natural disaster is detected. Single or multiple secondary notifications are published following the primary notification.

According to the related specifications, a primary notification message corresponding to the primary notification and a secondary notification message corresponding to the secondary notification are both provided by system information that is seen as broadcast information and transmitted on a BCCH (Broadcast Control Channel). The primary notification message is contained in a SIB10 (System Information Block Type 10), whereas the secondary notification message is contained in a SIB11 or multiple SIB11s.

The secondary notification message is allowed to be segmented, and the segments are transmitted via multiple SIB11s. Transmission cycles through the different segments belonging to a single secondary notification message at subsequent occasions for this SIB.

The abovementioned primary and secondary notification message transmission is applied for both the LTE/UMTS/GERAN UEs in a RRC_CONNECTED mode or a RRC_IDLE mode.

A LTE-Advanced (LTE-A) system is also standardized by the 3GPP as an enhancement of LTE system. The LTE-A system targets faster switching between power states, improves performance at the cell edge, and includes subjects, such as bandwidth extension, coordinated multipoint transmission/reception (COMP), uplink multiple input multiple output (MIMO), etc.

A LTE-A UE in a RRC_CONNECTED mode is capable of using multiple component carriers to establish multiple connections with at least one cell. Thus, how to perform transmission/reception of the primary and secondary notification messages for the LTE-A UE supporting the ETWS system is a topic for discussion.

SUMMARY OF THE INVENTION

A method and related device for handling data transmission associated with natural disaster notification a wireless communication system is disclosed.

A method of handling data transmission associated with natural disaster notification for a mobile device of a wireless communication system is disclosed. The method includes activating a plurality of physical mediums for data reception in a radio resource control connected mode, and receiving a natural disaster notification message via at least some of the plurality of physical mediums.

A method of handling data transmission associated with natural disaster notification for a network of a wireless communication system is disclosed. The method includes configuring a plurality of physical mediums for data transmission to a mobile device, segmenting a natural disaster notification message into a plurality of segments, and transmitting the plurality of segments to the mobile device on each of a plurality of physical mediums.

A mobile device of a wireless communication system for handling data transmission associated with natural disaster notification is disclosed. The mobile device includes means for activating a plurality of physical mediums for data reception in a radio resource control connected mode, and means for receiving a natural disaster notification message via at least some of the plurality of physical mediums.

A network of a wireless communication system for handling data transmission associated with natural disaster notification is disclosed. The network includes means for configuring a plurality of physical mediums for data transmission to a mobile device, means for segmenting a natural disaster notification message into a plurality of segments, and means for transmitting the plurality of segments to the mobile device on each of a plurality of physical mediums.

These and other objectives will no doubt become obvious to those of ordinary skill in the art after reading the following detailed description of the preferred example that is illustrated in the various figures and drawings.

DETAILED DESCRIPTION

Figure 1:
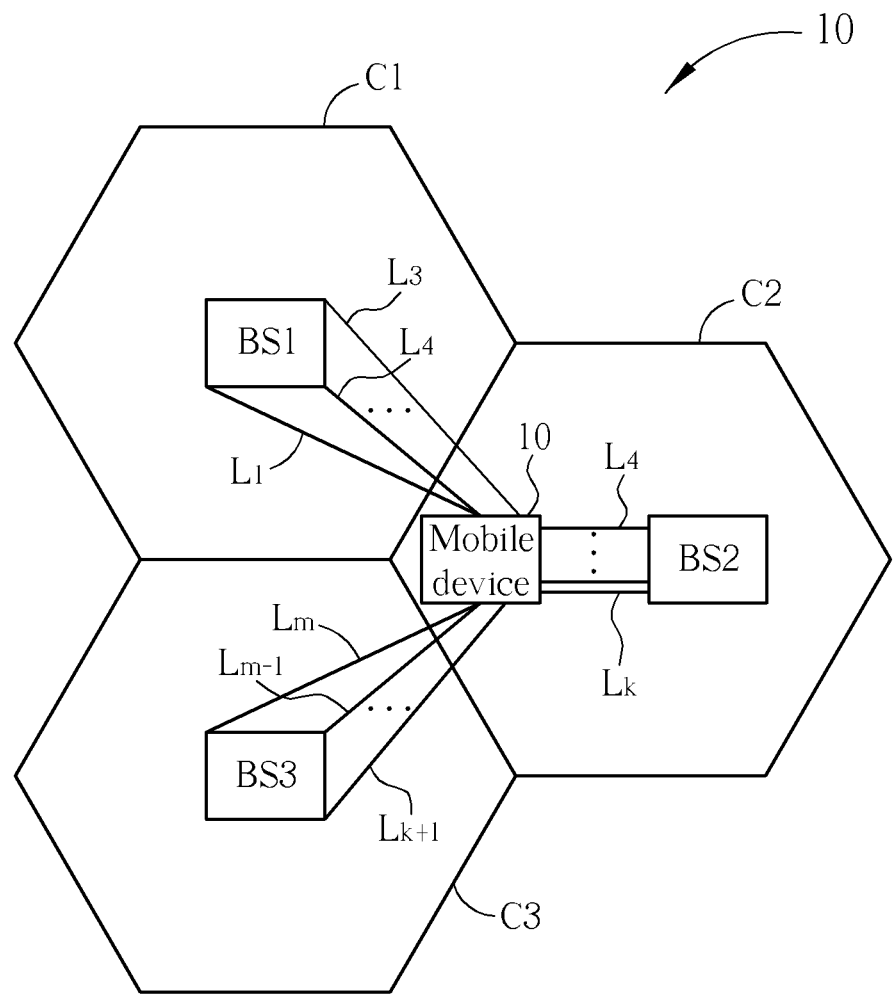
FIG. 1 is a schematic diagram of a wireless communication system according to an example.

Please refer to FIG. 1, which illustrates a schematic diagram of a wireless communication system 10 according to an example. In FIG. 1, the mobile device 10 can be a mobile phone, a computer system, a PDA (Personal Digital Assistant), etc and is capable of communicating with base stations BS1-BS3 through links L1-Lm, where k<m. The mobile device 10 can use component carriers CA1-CAn to establish the links L1-Lm respectively. Activation and number of component carriers of the mobile device 10 may be configured by any of the base stations BS1-BS3 controlling cells C1-C3 respectively. In addition, the mobile device 10 is also capable of CoMP (Coordinated Multi-Point) transmission with which more than one base station can coordinate a data transmission in time, frequency or space so as to minimize inter-cell interferences and propagation loss effects. For example, the mobile can simultaneously receive data from the base stations BS1-BS2 through the links L1 and Lk on which transmissions of the data have been coordinated by the base stations BS1-BS2. In this situation, the cells C1-C2 are known as CoMP cells. The wireless communication system 10 may be a LTE-A (Long Term Evolution-Advance) system or other system supporting multiple carriers for one mobile device or CoMP transmission. Thereby the base stations BS1-BS3 can refer to eNBs (evolved Node-Bs), and the mobile device 10 can refer to a user equipment (UE). In FIG. 1, only the mobile device 10 is shown for convenience in explaining the concept of the invention.

When a natural disaster (e.g. earthquake or tsunami) occurs, a notification service provider (e.g. the government) may publish warning notifications to the operator of the wireless communication system 10, so as to notify the user of the mobile device 10. In this situation, the base stations BS1-BS3 may make the natural disaster notifications into several natural disaster notification messages that needed to be forward to the mobile device 10. And thereby the user of the mobile device 10 can know information about the natural disaster, caution areas, how to escape from the natural disaster, etc. A reception indication message may be used for the base stations BS1-BS3 to require the mobile device 10 to start receive the natural disaster notification messages. For the ETWS (Earthquake and Tsunami Warning System) system application, the natural disaster notification message may be a primary or secondary notification message, and the reception indication message may be a paging message/system information message notifying the UE that the reception of the primary or secondary notification message is available.

Figure 2:
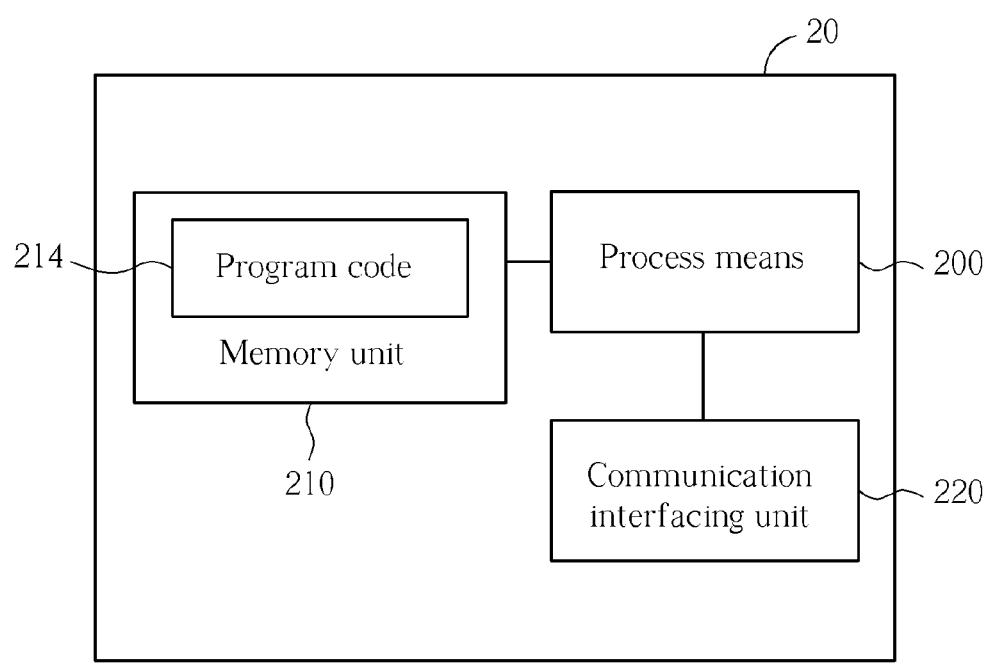
FIG. 2 is a schematic diagram of a communication device according to an example.

Please refer to FIG. 2, which illustrates a schematic diagram of a communication device 20 according to an example. The communication device 20 may be the mobile device 10 or any of the base stations BS1-BS3 shown in FIG. 1 and may include a processing means 200 such as a microprocessor or ASIC (Application-Specific Integrated Circuit), a memory unit 210 and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals with other communication devices according to processing results of the processing means 200.

Figure 3:
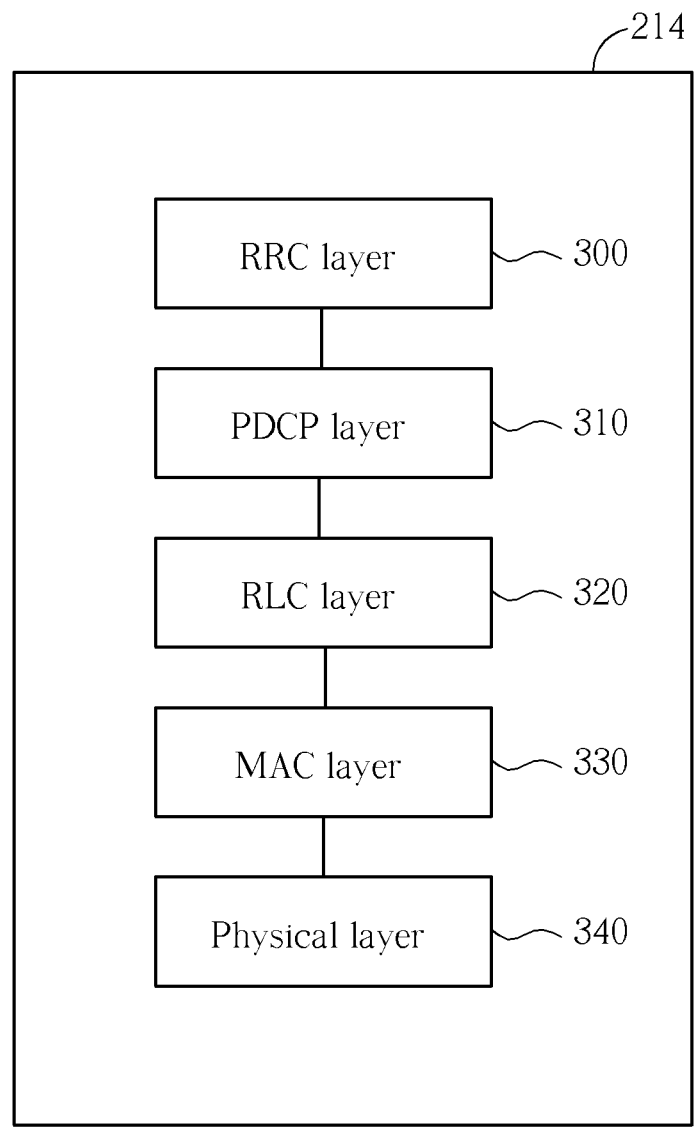
FIG. 3 is a schematic diagram of program code of the communication device according to FIG. 2.

Please refer to FIG. 3, which illustrates a schematic diagram of the program code 214 applied to the LTE-A or LTE system. The program code 214 includes program code of multiple communications protocol layers, which from top to bottom are a radio resource control (RRC) layer 300, a Packet Data Convergence Protocol (PDCP) layer 310, a radio link control (RLC) layer 320, a medium access control (MAC) layer 330 and a physical (PHY) layer 340. The RRC layer 300 is responsible for handling RRC connections, e.g. (re)establishment, release, etc by means of RRC messages, information elements or system information read from cells. In the mobile device application, the RRC layer 300 provides an RRC_CONNECTED mode, where the communication device 20 has at least one RRC connection with multiple cells or one base station, and an RRC_IDLE mode, where the communication device 20 has no RRC connection with the network. The RLC layer 320 and/or the MAC layer 330 may setup multiple entities to independently manage the multiple links (e.g. L1-Lm in FIG. 1). The PHY layer 340 may be responsible for configuring multiple component carriers (e.g. CA1-CAm in FIG. 1) corresponding to the links. Most related operations of the abovementioned layers can refer to LTE or LTE-A specifications developed by the 3GPP and detailed description thereof are omitted herein.

Figure 4:
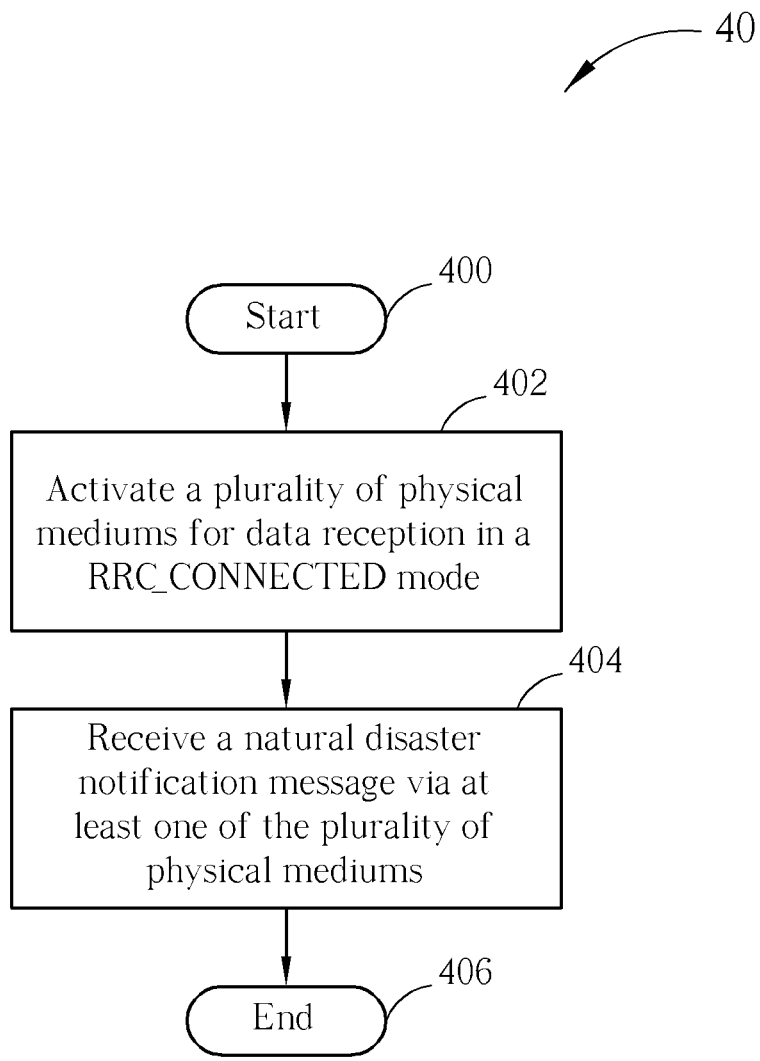
FIGS. 4-7 are flowcharts of processes for handling natural disaster data transmission according to examples.

Please refer to FIG. 4, which is a flowchart of a process 40 according to an example. The process 40 is used for handling data transmission associated with natural disaster notification for a UE in a wireless communication system. The process 40 may be compiled into the program code 214 and include the following steps:

Step 400: Start.

Step 402: Activate a plurality of physical mediums for data reception in a RRC_CONNECTED mode.

Step 404: Receive a natural disaster notification message via at least one of the plurality of physical mediums.

Step 406: End.

According to the process 40, the UE in the RRC_CONNECTED mode activates multiple physical mediums to perform data reception via multiple connections (e.g. multiple component carriers, RRC connections or RLC links). The activation of the physical mediums may be controlled by the network, which will be described in detail below. The UE using the physical mediums in a RRC_CONNECTED mode receives the natural disaster notification message via one or more physical mediums. Thus, though the process 40, the UEs in the RRC_CONNECTED mode possesses higher reception efficiency of each natural disaster notification message than the UEs in the RRC_IDLE mode do.

In addition, the UE may receive a natural disaster notification message via only one of the physical mediums based on configuration assigned by the network.

The physical mediums capable of establishing multiple connections for the UE may be, but not limit to, component carriers or CoMP cells. That is, the UE may use the component carriers to establish at least one connection with at least one base station. The UE may establish multiple connections with multiple CoMP cells. For the ETWS system application, each of the component carriers or CoMP cells is configured with a BCCH (Broadcast Control Channel) transferring the primary and secondary notification messages to the UE.

Figure 5:
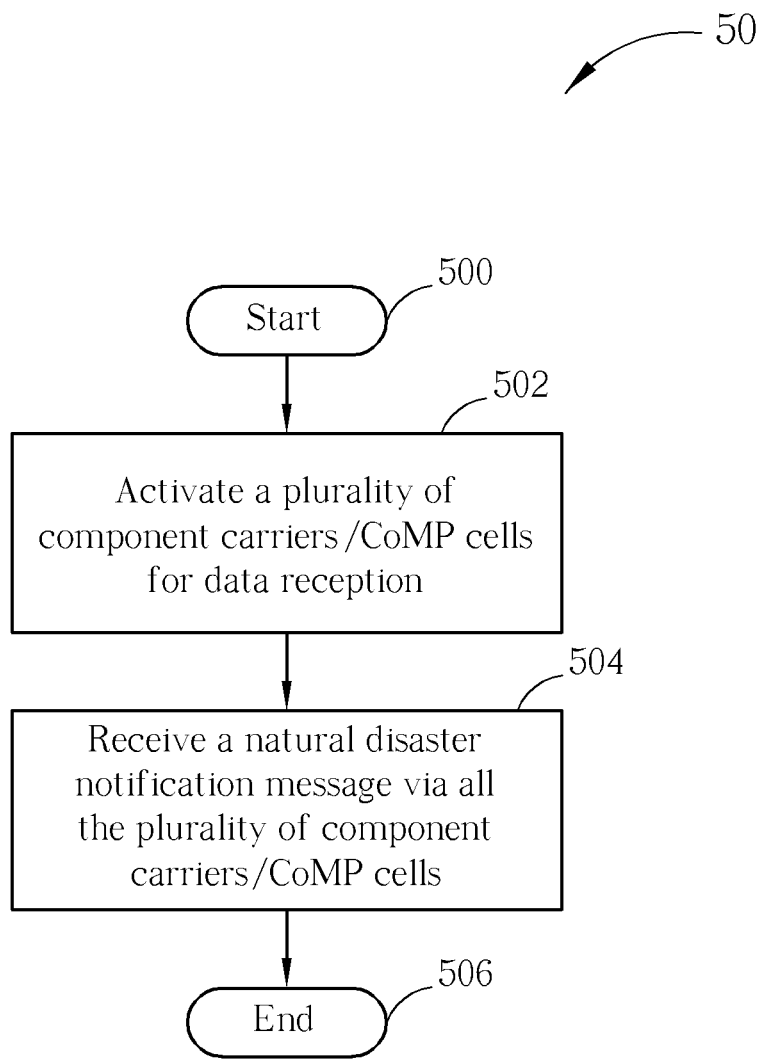

Please refer to FIG. 5, which is a flowchart of a process 50 according to an example. The process 50 is used for handling data transmission associated with natural disaster notification for a UE in the RRC_CONNECTION mode in a wireless communication system. The process 50 may be compiled into the program code 214 and include the following steps:

Step 500: Start.

Step 502: Activate a plurality of component carriers/CoMP cells for data reception.

Step 504: Receive a natural disaster notification message via all the plurality of component carriers/CoMP cells.

Step 506: End.

According to the process 50, the UE using multiple component carriers/CoMP cells in the RRC_CONNECTION mode receives the natural disaster notification message via all of the component carriers/CoMP cells. The UE may start to receive the natural disaster notification message via all the component carriers/CoMP cells when a reception indication message is received on any one of the component carriers or from any one of the CoMP cells. Since the component carriers or CoMP cells may be configured with different scheduling configuration, reception qualities of the component carriers or CoMP cells are different. Thus, by communicating with the UE performing process 50, the base station does not need to determine which component carrier or what CoMP cell combination can provide the best communication quality, and the UE can receive the natural disaster notification message as soon as possible.

For the ETWS system application, the reception indication message may be a paging message may include an "etws-PrimaryNotificationIndication" field that is a value represented by one bit and included in the paging message to indicate "ETWS primary notification present". When receiving this bit of the paging message, the UE immediately reads each SIB1 (System information type 1) of all the component carriers/CoMP cells to find scheduling information for corresponding SIB10 and retrieves corresponding primary notification message via those SIB10s. Or the reception indication message may be a system information message indicating that the primary and/or secondary notification message is under broadcast.

In addition, the base stations in charge of sending the natural disaster notification message may segment the natural disaster notification message by different sizes or different segment numbers. In this situation, the UE separately receives segments of the natural disaster notification message on the component carriers or from the CoMP cells. In other words, the UE does not mix the segments received from different component carriers or CoMP cells. The UE then concatenates the segments received via the same component carrier or from the CoMP cell. When a complete natural disaster notification message is obtained, the UE may stop all reception of the natural disaster notification message.

Take an example with reference to FIG. 1. The UE as well as the mobile device 10 is configured to use the links L1 and L4 which correspond to the component carriers CA1 and CA4 respectively. In this situation, the base stations BS1 and BS2 take charge of sending a natural disaster notification message to the UE when a natural disaster occurs. The base stations BS1 and BS2 send the natural disaster notification message in segment form. The base stations BS1 generates five segments labeled with numbers 1-5 respectively based on its current communication quality, whereas the base stations BS2 generates ten segments labeled with numbers 1-10 respectively. The UE starts to receive the natural disaster notification message via both the links CA1 and CA4 when a reception indication message sent by any of the base stations BS1 and BS2 is received. The UE separately stores and combines segments received via the component carrier CA1 and segments received via the component carrier CA4. In other words, for example, the UE is able to know which link a received segment labeled any of '1'-'5' belongs to. The combinations the links CA1 and CA4 are performed parallely, independently. When the UE obtains the complete natural disaster notification message via any of the component carriers CA1 and CA4, the reception via both the component carriers CA1 and CA4 for the natural disaster notification message is then stopped.

Figure 6:
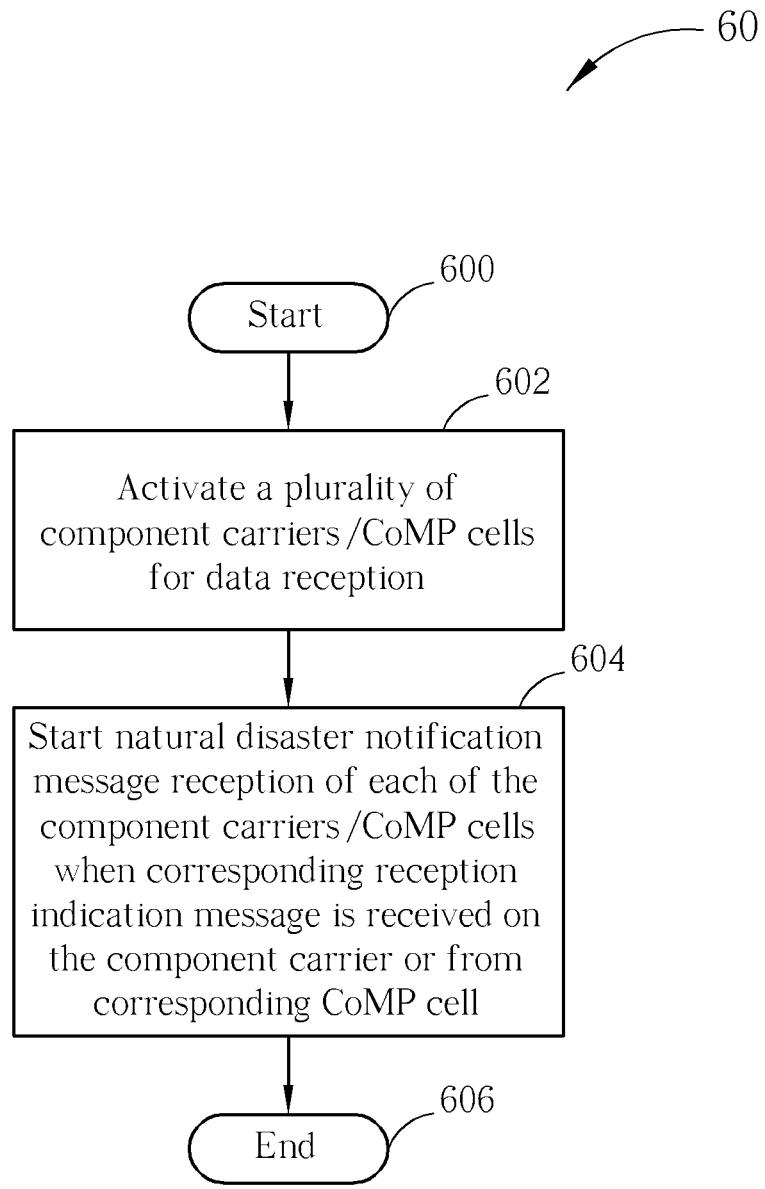

Please refer to FIG. 6, which is a flowchart of a process 60 according to an example. The process 60 is used for handling data transmission associated with natural disaster notification for a UE in the RRC_CONNECTION mode in a wireless communication system. The process 60 may be compiled into the program code 214 and include the following steps:

Step 600: Start.

Step 602: Activate a plurality of component carriers/CoMP cells for data reception.

Step 604: Start natural disaster notification message reception of each of the component carriers/CoMP cells when corresponding reception indication message is received on the component carrier or from corresponding CoMP cell.

Step 606: End.

According to the process 60, the UE may activate the component carriers/CoMP cells for data reception based on configuration assigned by a donor base station and starts the natural disaster notification message reception of each component carrier/CoMP cell when corresponding reception indication message is received on the component carrier or from the CoMP cell. Each reception indication message may be a paging or system information message described above. In addition, the UE having started the reception of any component carrier(s)/CoMP cell(s) may remain deactivating natural disaster notification message reception of the component carriers/CoMP cells via which no reception indication message is received. Take an example E1 with reference to FIG. 1. The UE activates the component carriers CA1-CAm and thereby establishes the links L1-Lm. When the UE receives reception indication messages on both the links L1 and L4, the natural disaster notification message receptions of the component carriers CA1, CA4 are started, and the natural disaster notification message receptions of the component carriers CA2-CA3, CA5-CAm remain deactivated.

Through the process 60, in advance of natural disaster notification message transmission, the network (e.g. the donor base station) may determine what component carriers/CoMP cells of the UE have good enough quality for transfer of the natural disaster notification message and then sends the reception indication messages on the qualified component carriers/CoMP cells, via which the UE will perform the natural disaster notification message reception.

On the other hand, the base stations may segment the natural disaster notification message in the same way and send all segments of a natural disaster notification message on each of the component carriers/CoMP cells. In this situation, the UE may separately store segments of the natural disaster notification message via the component carriers/CoMP cells performing the reception. The separate storing herein means that the UE records via which component carrier/CoMP cell each stored segment is received. Then, the UE may concatenate the segments received via the same component carrier/CoMP cell and stops the natural disaster notification message reception of the component carriers/CoMP cells. Take an example following the scenario of the example E1. The UE separately stores the segments received via the links L1 and L4. In other words, the UE knows each of the received segments is received via the link L1 or L4. Then, the UE combines the segments all received from the L1 and also combines the segments all received from the L4. The combinations associated with the links L1 and L4 are performed parallely, independently. When a complete natural disaster notification message is obtained from any of the two combining operations, the UE stops reception of both the component carriers CA1, CA4.

Alternatively, the base stations segmenting the natural disaster notification message in the same way may configure each of the component carriers/CoMP cells performing the transmission to transfer part of content of the natural disaster notification message, i.e. not all segments of the natural disaster notification message. In this situation, the UE may store the segments via the component carriers/CoMP cells performing the transmission separately or together. In other words, the UE may not need to distinguish which link the received segments are received from. The UE concatenates the stored segments irrespective of the source links. Take an example following the scenario of the example E1, and in this example, segments SE1-SE5 of the natural disaster notification message are sent on each of the links L1 and L4. The UE may store the segments received via the links L1 and L4 together. The UE collects the segments SE1-SE5, irrespective of from the link L1 or L4 for combination. In consideration of receiving efficiency, the UE collects the segments SE1-SE5 that are arrived first. For example, the UE earlier receives a segment SE1 via the link L1 than the link L4 and then stores this segment SE1. Then, the UE turns to collect a segment SE2 and pick a segment SE2 via the link L4 if no segment SE2 of the link L1 arrives the UE earlier than that of the link L4, and so on. Finally, the UE may stop reception of both the component carriers CA1, CA4 when a complete natural disaster notification message is obtained.

Figure 7:
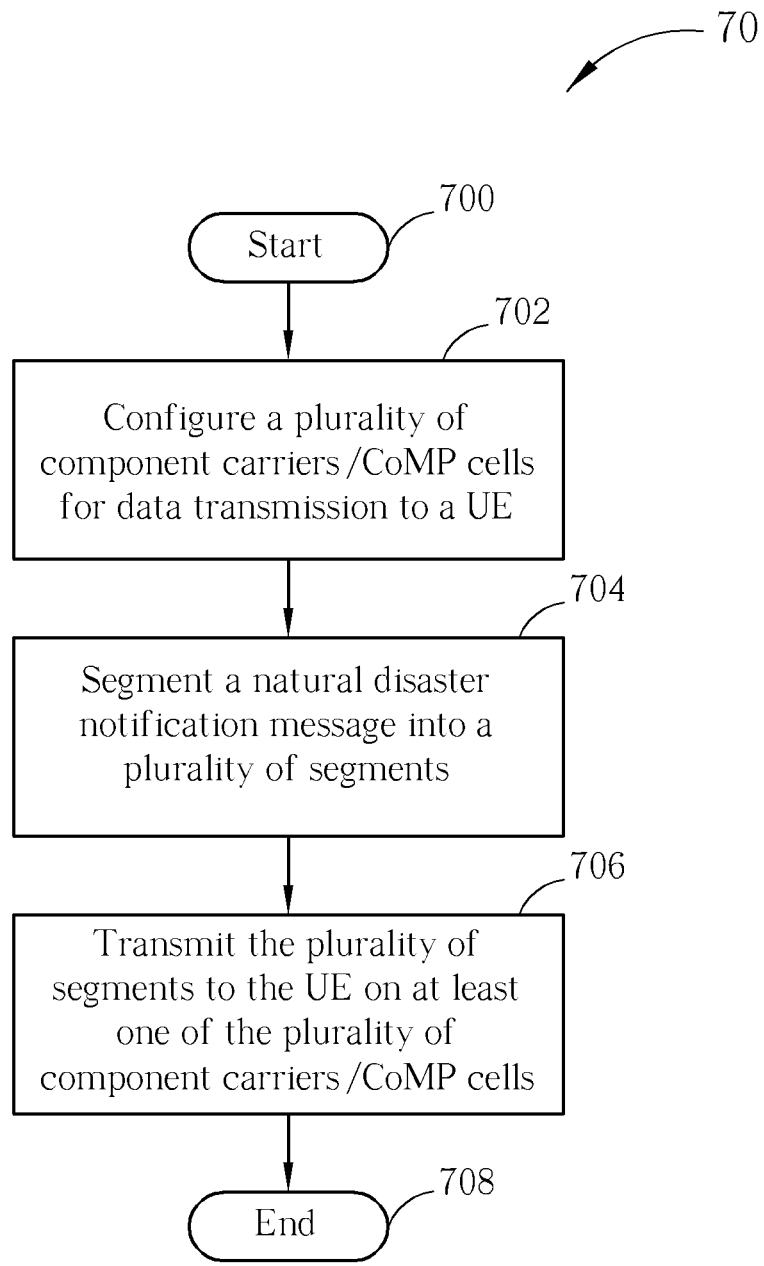

Please refer to FIG. 7, which is a flowchart of a process 70 according to an example. The process 70 is used for handling data transmission associated with natural disaster notification for a network of a wireless communication system. The process 70 may be compiled into the program code 214 and include the following steps:

Step 700: Start.
Step 702: Configure a plurality of component carriers/CoMP cells for data transmission to a UE.
Step 704: Segment a natural disaster notification message into a plurality of segments.
Step 706: Transmit the plurality of segments to the UE on at least one of the plurality of component carriers/CoMP cells.
Step 708: End.

According to the process 70, the network may be a set of the base stations jointly serving the UE and configures multiple component carriers/CoMP cells for data transmission to the UE. The segments of the natural disaster notification message are transmitted on at least one of the configured component carriers/CoMP cells. The transmission way may be broadcast (e.g. broadcast on system information). In other words, the base stations segment the natural disaster notification message into segments with same numbers of segments and each segment attached with same segment identity has the same data. The segment parameters may be predetermined in the base stations.

Take an example with reference to FIG. 1. Any of the base stations BS1, BS2 and BS3 may configure the component carriers CA1-CA2, CA4, and CAm to establish the links L1-L2, L4, and Lm with the UE (i.e. the mobile device 10). The base stations BS1, BS2 and BS3 may generate the natural disaster notification message according to natural disaster notification content published by the natural disaster service provider. Due to radio resource allocation strategy, the natural disaster notification message needs to be transmitted to the UE in segment form. Each of the base stations BS1, BS2 and BS3 may segment the natural disaster notification message into segments SEM1-SEM8 attached with identity numbers 1-8 respectively. The number of segment and identity set may be predetermined. The segments SEM1-SEM8 are then transmitted on each of the links L1-L2, L4, and Lm. In other words, the UE is able to receive all of the segments SEM1-SEM8 via any of the links L1-L2, L4, and Lm if no erroneous situation during the segment reception occurs. Decoding of different links could be irrelevant.

Thus, through the process 70, the UE can concatenate the segments, irrespective of corresponding source component carrier or CoMP cell, when the natural disaster notification message is segmented into the same size by different base stations.

Please note that the steps of the abovementioned processes, including suggested steps, can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, some of the examples as mentioned above provide ways of how to receive and send the natural disaster notification message to provide higher message transfer efficiency so that the UE can receive the message as soon as possible. In addition, some of the examples provide ways of how to process corresponding segments received via multiple physical mediums in order to avoid errors in segment combination.

Those skilled in the art will readily observe that numerous modifications and alterations of the device and method may be made while retaining the teachings and the scope of the disclosure. Accordingly, the above disclosure should be construed as limited only by the metes and bounds of the appended claims.

What is claimed is:

1. A method of handling data transmission associated with natural disaster notification for a mobile device in a network of a wireless communication system, the method comprising:
the mobile device activating a plurality of component carriers for data reception in a radio resource control connected mode;
the mobile device receiving segments of a natural disaster notification message via only one of the plurality of component carriers; and
the mobile device concatenating the received segments of the natural disaster notification message, wherein the natural disaster notification message is segmented into the segments by the network, and all of the segments are transmitted from the network to the mobile device on the only one component carrier.

2. The method of claim 1, wherein the mobile device receiving the natural disaster notification message via the only one of the plurality of component carriers comprises:
the mobile device starting natural disaster notification message reception of the only one of the plurality of component carriers when corresponding reception indication message is received on the component carrier.

3. The method of claim 2 further comprising when the natural disaster notification message reception of one of the plurality of component carriers is started, remaining deactivation of natural disaster notification message reception of the component carriers via which no reception indication messages are received.

4. The method of claim 3 further comprising:
separately storing segments of the natural disaster notification message received via the component carriers whose natural disaster notification message receptions are started;
concatenating the stored segments of the natural disaster notification message received via the same component carrier; and
when the natural disaster notification message is completely received via one of the component carriers, stopping the natural disaster notification message reception of the component carriers.

5. The method of claim 3 further comprising:
storing segments of the natural disaster notification message received via the component carriers whose natural disaster notification message receptions are started, wherein not all segments of the natural disaster notification message are sent on one of the plurality of component carriers; and
concatenating the stored segments of the natural disaster notification message.

6. A method of handling data transmission associated with natural disaster notification for a network of a wireless communication system, the method comprising:
the network configuring a plurality of component carriers for data transmission to a mobile device;
the network segmenting a natural disaster notification message into a plurality of segments; and
a plurality of base stations of the network separately transmitting the plurality of segments to the mobile device and each of the plurality of base stations transmitting the plurality of segments on only one of the plurality of component carriers;
wherein the network segmenting the natural disaster notification message into the plurality of segments comprises each of the plurality of base stations of the network separately segmenting the natural disaster notification message into the plurality of segments.

7. A mobile device for handling data transmission associated with natural disaster notification in a network of a wireless communication system, the mobile device comprising:
a processing means;
a memory unit; and
a program code, stored in the memory unit, for instructing the processing means to execute the following steps:
activating a plurality of component carriers for data reception in a radio resource control connected mode;
receiving segments of a natural disaster notification message via only one of the plurality of component carriers; and
concatenating the received segments of the natural disaster notification message, wherein the natural disaster notification message is segmented into the segments by the network, and all of the segments are transmitted from the network to the mobile device on the only one component carrier.

8. The mobile device of claim 7, wherein the step of receiving the natural disaster notification message via the only one of the plurality of component carriers comprises:
starting natural disaster notification message reception of the only one of the plurality of component carriers when corresponding reception indication message is received on the component carrier.

9. The mobile device of claim 8, wherein the program code further instructs the processing means to execute the following step:
when the natural disaster notification message reception of one of the plurality of component carriers is started, remaining deactivation of natural disaster notification message reception of the component carriers via which no reception indication messages are received.

10. The mobile device of claim 9, wherein the program code further instructs the processing means to execute the following steps:
separately storing segments of the natural disaster notification message received via the component carriers whose natural disaster notification message receptions are started;
concatenating the stored segments of the natural disaster notification message received via the same component carrier; and
when the natural disaster notification message is completely received via one of the component carriers, stopping the natural disaster notification message reception of the component carriers.

11. The mobile device of claim 9, wherein the program code further instructs the processing means to execute the following steps:
storing segments of the natural disaster notification message received via the component carriers whose natural disaster notification message receptions are started, wherein not all segments of the natural disaster notification message are sent on one of the plurality of component carriers; and
concatenating the stored segments of the natural disaster notification message.

* * * * *